US012599855B2

(12) United States Patent
Lee et al.

(10) Patent No.: US 12,599,855 B2
(45) Date of Patent: *Apr. 14, 2026

(54) DOUBLE FILTER APPARATUS INCLUDING GAS SUPPLY TUBE AND SYSTEM INCLUDING THE SAME

(71) Applicant: NATIONAL INSTITUTE OF ECOLOGY, Seocheon-gun (KR)

(72) Inventors: Won Jun Lee, Gwangju (KR); Ji Yeong Kim, Gunsan (KR)

(73) Assignee: NATIONAL INSTITUTE OF ECOLOGY, Seocheon-gun (KR)

( * ) Notice: Subject to any disclaimer, the term of this patent is extended or adjusted under 35 U.S.C. 154(b) by 424 days.

This patent is subject to a terminal disclaimer.

(21) Appl. No.: 18/334,550

(22) Filed: Jun. 14, 2023

(65) Prior Publication Data

US 2024/0009605 A1 Jan. 11, 2024

(30) Foreign Application Priority Data

Jul. 8, 2022 (KR) ........................ 10-2022-0084135

(51) Int. Cl.
*B01D 35/30* (2006.01)
*B01D 29/56* (2006.01)

(52) U.S. Cl.
CPC ............. *B01D 35/30* (2013.01); *B01D 29/56* (2013.01); *B01D 2201/302* (2013.01); *B01D 2201/31* (2013.01)

(58) Field of Classification Search
CPC .. B01D 35/30; B01D 29/56; B01D 2201/302; B01D 2201/31; Y02W 10/10
See application file for complete search history.

(56) References Cited

FOREIGN PATENT DOCUMENTS

| | | | | |
|---|---|---|---|---|
| JP | H04-358592 | A | 12/1992 | |
| JP | H04358592 | * | 12/1992 | ............ B01D 65/08 |
| JP | 2006-326517 | A | 12/2006 | |
| JP | 2017-202476 | A | 11/2017 | |
| KR | 10-2004-0019464 | A | 3/2004 | |
| KR | 10-0491513 | B1 | 5/2005 | |
| KR | 10-2010-0127132 | A | 12/2010 | |
| KR | 2013-0104645 | A | 9/2013 | |
| KR | 10-1560173 | B1 | 10/2015 | |
| KR | 10-2017-0024597 | A | 3/2017 | |
| KR | 10-1894544 | B1 | 9/2018 | |
| KR | 20-0490277 | Y1 | 10/2019 | |
| KR | 10-2021-0030158 | A | 3/2021 | |
| KR | 10-2349534 | B1 | 1/2022 | |

* cited by examiner

*Primary Examiner* — Waqaas Ali

(57) ABSTRACT

According to various exemplary embodiments of the present disclosure, a double filter apparatus including a gas supply tube and a system including the same are applied to be supplied with oxygen from the outside through the gas supply tube to maintain the amount of dissolved oxygen in the filter structure at a high level and increasing the activity of aerobic microorganisms to perform the aerobic water treatment.

10 Claims, 9 Drawing Sheets

<u>10</u>

(a)                    (b)

(a)                                             (b)

DOUBLE FILTER APPARATUS INCLUDING GAS SUPPLY TUBE AND SYSTEM INCLUDING THE SAME

CROSS-REFERENCE TO RELATED APPLICATIONS

This application claims priority to and the benefit of Korean Patent Application No. 10-2022-0084135 filed in the Korean Intellectual Property Office on Jul. 8, 2022, the entire contents of which are incorporated herein by reference.

BACKGROUND

Field

The present invention relates to a double filter apparatus and a system including the same and more particularly, to a double filter apparatus including a gas supply tube and a system including the same.

Description of the Related Art

The contents described in this section merely provide background information on the present exemplary embodiment but do not constitute the related art.

Generally, a filter structure is a device for purifying raw water such as tap water or mineral water or purifying air containing solid particles such as dust and removes heavy metals or other harmful substances contained in the fluid based on the water purification method including processes such as precipitation, filtration, and sterilization to provide a fluid containing only beneficial substances to the human body.

Such a filter structure includes various filters to purify the fluid so that in recent years, research on a filter structure having a miniaturized and compact design is being actively conducted, and research is also needed to minimize the hassle of filter replacement of filters with different exchange cycles included in the filter structure.

Further, research is required for the filter structure that can be applied to a slim water purification system with a miniaturized and compact design to obtain reliable water purification efficiency while reducing the length of the housing.

Proper water treatment is an important requirement to prevent waterborne diseases and maintain a healthy environment. A treatment process involving microorganisms or organisms is called biological water treatment. There are two types of biological water treatment: aerobic water treatment and anaerobic water treatment. Aerobic water treatment is carried out by aerobic microorganisms. The aerobic microorganisms require oxygen. Accordingly, a filter structure which can be supplied with oxygen needs to be studied.

RELATED ART DOCUMENT

Patent Document (Patent Document 1) Korean Registered Patent No. 10-1560173 (Oct. 7, 2015)
(Patent Document 2) Korean Registered Patent No. 10-0491513 (May 17, 2005)

(Patent Document 3) Korean Unexamined Patent Application Publication No. 10-2021-0030158 (Mar. 17, 2021)

SUMMARY

An object to be achieved by the present disclosure is to provide a double filter apparatus including a gas supply tube which is supplied with oxygen from the outside through the gat supply tube to perform aerobic water treatment by maintaining the amount of dissolved oxygen in the filter structure at a high level and increasing the activity of aerobic microorganisms.

Other and further objects of the present disclosure which are not specifically described can be further considered within the scope easily deduced from the following detailed description and the effect.

In order to achieve the above-described objects, according to an aspect of the present disclosure, a double filter apparatus includes a housing unit which is provided to penetrate in a longitudinal direction to include an inner space; an inlet unit which is located at one side of the housing unit and provides an inflow path of the fluid; a first filter unit which includes a first space and sucks fluid introduced from the inflow path in the longitudinal direction and discharges the sucked fluid to the width direction; a second filter unit which sucks the discharged fluid in the width direction and discharges the fluid in the longitudinal direction; a partition which connects the first filter unit and the second filter unit; and an outlet unit which is located at the other side of the housing unit and provides an outflow path of the fluid discharged from the second filer unit; and a gas supply tube which is provided to supply gas supplied from the outside to the first space.

Here, the gas supply tube includes: a first pipe line which is provided to penetrate an outer wall of the housing unit from the outside of the housing unit; and a second pipe line which is connected to the first pipe line and provides a movement path to supply the gas supplied through the first pipe line to the first space.

Here, the gas supply tube further includes: a third pipe line which is connected to the first pipe line and the second pipe line and provides a path to discharge the gas from the first space to the outside of the housing unit.

Here, the partition which is fixed to an inner circumferential surface of the housing unit to divide the inner space of the housing unit into a space in which the first filter unit is located and a space in which the second filter unit is located and at least one through hole is provided to provide a movement path through which the fluid discharged from the first filter unit is introduced into the second filter unit is further provided.

In the first filter unit, an empty space is provided to penetrate in the longitudinal direction and the first space is an empty space provided in the first filter unit.

Here, the partition includes a filter fixing protrusion which is provided to be fitted into the empty space provided in the first filter unit to fix the first filter unit to the partition.

Here, the partition provides a second space to penetrate in the width direction, the first pipe line is located to be continued with the second space from the outside of the housing unit, and the third pipe line is located to be continued with the outside of the housing unit from the second space.

Here, the filter fixing protrusion includes: a third space which penetrates in the longitudinal direction, at least partially overlaps the second space, and is connected to the first space, and the second pipe line is located in the third space.

Here, the inlet unit includes a first path providing protrusion which is provided with an empty space therein to penetrate in the length direction to provide a path through which the fluid is introduced into the inner space of the first filter unit and at least partially fitted into the empty space provided in the first filter unit.

Here, the first path providing protrusion is provided to at least partially protrude outwardly from the housing unit.

Here, the through hole includes a screw thread formed by spirally winding along the inner circumferential surface.

Here, the through hole penetrates to form a spiral structure with a longitudinal direction of the partition as an axis.
In order to achieve the above-described objects, according to an aspect of the present disclosure, a double filter system includes: a double filter apparatus including: a housing unit which is provided to penetrate in a longitudinal direction to include an inner space; an inlet unit which is located at one side of the housing unit and provides an inflow path of the fluid; a first filter unit which includes a first space and sucks fluid introduced from the inflow path in the longitudinal direction and discharges the sucked fluid to the width direction; a second filter unit which sucks the discharged fluid in the width direction and discharges the fluid in the longitudinal direction; an outlet unit which is located at the other side of the housing unit and provides an outflow path of the fluid discharged from the second filer unit; and a gas supply tube which is provided to supply gas supplied from the outside to the first space; and an oxygen container which accommodates oxygen and is connected to the gas supply tube through the pipe to supply oxygen to the double filter apparatus.

Here, the gas supply tube includes: a first pipe line which is provided to penetrate an outer wall of the housing unit from the outside of the housing unit; and a second pipe line which is connected to the first pipe line and provides a movement path to supply the gas supplied through the first pipe line to the first space.

Here, the gas supply tube further includes: a third pipe line which is connected to the first pipe line and the second pipe line and provides a path to discharge the gas from the first space to the outside of the housing unit.

According to the exemplary embodiment of the present disclosure as described above, the double filter apparatus including a gas supply tube and a system including the same are applied to be supplied with oxygen from the outside through the gat supply tube to perform aerobic water treatment by maintaining the amount of dissolved oxygen in the filter structure at a high level and increasing the activity of aerobic microorganisms.

Even if the effects are not explicitly mentioned here, the effects described in the following specification which are expected by the technical features of the present disclosure and their potential effects are handled as described in the specification of the present disclosure.

DETAILED DESCRIPTION OF THE EMBODIMENT

Figure 1:
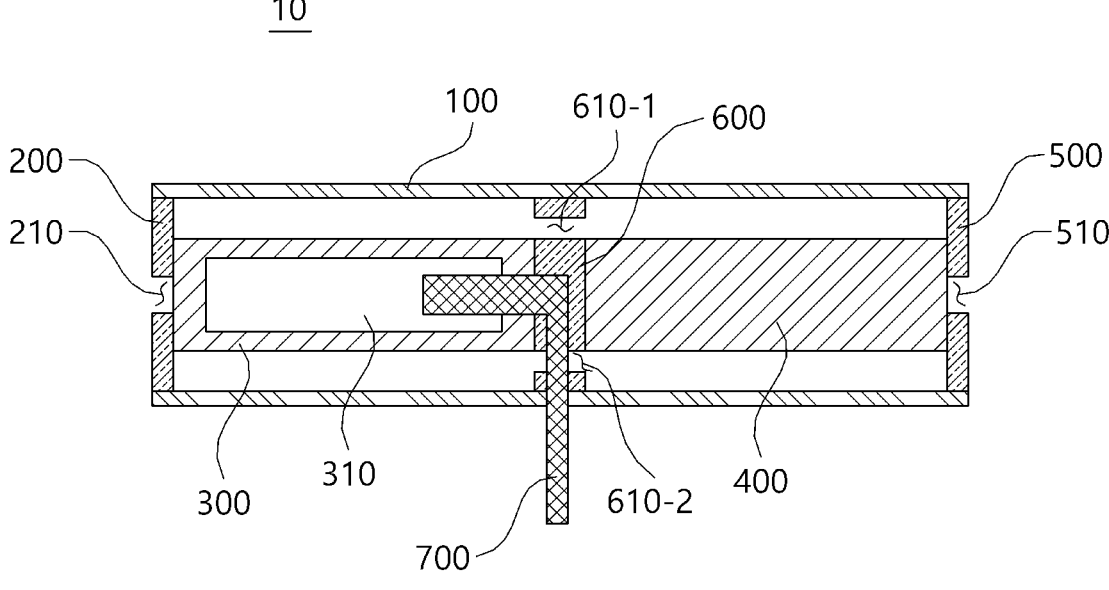
FIG. 1 is a perspective view illustrating a double filter apparatus according to an embodiment of the present disclosure.

Hereinafter, embodiments of the present disclosure will be described in detail with reference to the accompanying drawings. Advantages and characteristics of the present disclosure and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined. Terms used in the present application are just used to describe a specific exemplary embodiment and do not intend to limit the present invention and a singular expression may include a plural expression as long as it is not apparently contextually different. In the present application, it should be understood that term "have" "may have", "include" or "may include" indicates that a feature, a number, a step, an operation, a component, a part or a combination thereof described in the specification is present, but do not exclude a possibility of presence or addition of one or more other features, numbers, steps, operations, components, parts or combinations thereof, in advance. Terms including an ordinary number, such as first and second, are used for describing various constituent elements, but the constituent elements are not limited by the terms.

The above terms are used only to distinguish one component from the other component. For example, without departing from the scope of the present invention, a first component may be referred to as a second component, and similarly, a second component may be referred to as a first component. A term of and/or includes combination of a plurality of related elements or any one of the plurality of related elements.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

A double filter apparatus including a gas supply tube according to the present disclosure and a system including the same will be described in detail with reference to the accompanying drawings.

FIG. 1 is a perspective view illustrating a double filter apparatus according to an embodiment of the present disclosure.

FIG. 1 is a view illustrating a cross-section which is horizontal to the length direction of the double filter apparatus 10 according to the exemplary embodiment and perpendicular to a width direction.

In the present disclosure, the "length direction" is a "horizontal direction" with respect to FIG. 1 and the "width direction" is a "vertical direction" with respect to FIG. 1. Hereinafter, the exemplary embodiment will be described with respect to the defined direction.

Referring to FIG. 1, the double filter structure 10 includes a housing unit 100, an inlet unit 200, a first filter unit 300, a second filter unit 400, an outlet unit 500, a partition 600, and a gas supply tube 700.

The housing unit 100 is provided to penetrate in a length direction to include an inner space. The housing unit 100 may be integrally formed, but may be separated and reassembled to replace the inlet unit 200, the first filter unit 300, the second filter unit 400, and the outlet unit 500, and the partition 600 located in the inner space of the housing unit 100.

The housing unit 100 may have a cylindrical shape provided to penetrate in a length direction to include an inner space. The housing unit 110 may have an elliptical column shape or a rectangular parallelepiped shape. The housing unit 100 may have a shape in which the width becomes narrower or wider in the longitudinal direction. The housing unit 100 is also implemented to have a shape in which the width becomes narrower and then wider or wider and then narrower in the longitudinal direction.

The housing unit 100 may be formed with a material having a predetermined rigidity to prevent from being broken by a pressure of fluid therein or an external force supplied from the outside, such as a polymer compound (for example, plastic or acryl) or metal (for example, titanium) and also formed with a material which prevents corrosion or deterioration through use.

The inlet unit 200 is located at one side of the housing unit 100 and provides an incoming path of the fluid. A width of the inlet unit 200 is substantially equal to a width of one inner circumferential surface of the housing unit 100. The inlet unit 200 may be fitted into one inner circumferential surface of the housing unit 100.

The inflow path 210 may be provided to pass through the inlet unit 200 in the longitudinal direction.

The first filter unit 300 sucks the fluid introduced from the inflow path 210 provided by the inlet unit 200 and discharges the sucked fluid in the width direction.

A first space 310 may be provided in the first filter unit 300.

In the first space 310, aerobic microorganisms for aerobic water treatment may be located.

Aerobic microorganisms may include both obligate aerobic microorganisms, which require oxygen for growth and survival, and microaeropiles, which require oxygen for metabolic functions but require less oxygen.

The second filter unit 400 sucks the fluid discharged from the first filter unit 300 and discharges the fluid in the longitudinal direction.

Lengths and widths of the first filter unit 300 and the second filter unit 400 may be different from each other.

The first filter unit 300 and the second filter unit 400 may be various known types of filters, such as a sediment filter, a pre carbon filter, a post carbon filter, an UF filter, an RO filter, an ACF (activated carbon fiber) filter, an AC (activated carbon) filter, a membrane filter, a HEPA filter, a ceramic filter, a nano-fiber filter, or a polymer filter.

The partition 600 is fixed onto an inner circumferential surface of the housing unit 100 to divide the inner space of the housing unit 100 into a space in which the first filter unit 300 is located and a space in which the second filter unit 400 is located and at least one through hole 610 is provided to provide a movement path through which the fluid discharged from the first filter unit 300 is introduced into the second filter unit 400.

The partition 600 may be fitted into the inner circumferential surface of the housing unit 100 and may be adhered by various known methods. The partition 600 may be located near the center in the longitudinal direction of the housing part 100. A width of the partition 600 may be substantially the same as the width of the central inner circumferential surface of the housing unit 100 to which the partition 600 is fixed.

The through hole 610 may be provided so as to penetrate the partition 600 in the longitudinal direction. To be more specific, the through hole 610 may provide a movement path of the fluid between the space in which the first filter unit 300 is located and the space in which the second filter unit 400 is located.

The outlet unit 500 is located at the other side of the housing unit 100 and provides a discharging path 510 of the fluid discharged from the second filter unit 400. A width of the outlet unit 500 is substantially equal to a width of the other inner circumferential surface of the housing unit 100. The outlet unit 500 may be fitted into the other inner circumferential surface of the housing unit 100.

The discharging path 510 may be provided so as to penetrate the outlet unit 500 in the longitudinal direction.

The inlet unit 200, the outlet unit 500, and the partition 600 may be formed with a material having a predetermined rigidity to prevent from being broken by a pressure of fluid therein or an external force supplied from the outside, such as a polymer compound (for example, plastic or acryl) or metal (for example, titanium) and also formed with a material which is not corroded or degraded through use.

The gas supply tube 700 may be provided to supply gas supplied from the outside to the first space 310.

All the configurations illustrated in FIG. 1 are not essential configurations, and some configurations connected to the double filter structure 10 may be added, changed, and deleted.

Figure 2:
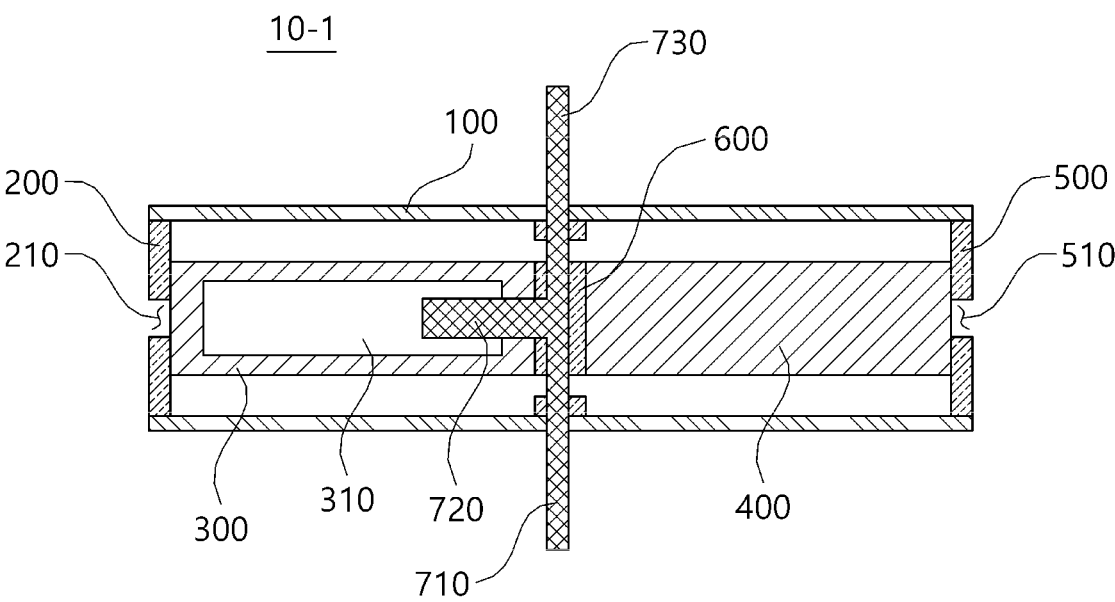
FIG. 2 is a perspective view illustrating a double filter apparatus according to another embodiment of the present disclosure.

FIG. 2 is a perspective view illustrating a double filter apparatus according to another embodiment of the present disclosure.

FIG. 2 is a view illustrating a cross-section which is horizontal to the length direction of the double filter apparatus 10-1 according to another exemplary embodiment and perpendicular to a width direction.

Referring to FIG. 2, the gas supply tube 700 includes a first pipe line 710, a second pipe line 720, and a third pipe line 730.

The first pipe line 710 may be provided to penetrate an outer wall of the housing unit 100 from the outside of the housing unit 100.

The second pipe line 720 is connected to the first pipe line and provides a movement path of the gas to supply the gas supplied through the first pipe line 710 to the first space 310.

The third pipe line 730 is connected to the first pipe line 710 and the second pipe line 720 and provides a movement path of the gas to discharge the gas from the first space 310 to the outside of the housing unit 100.

Figure 3:
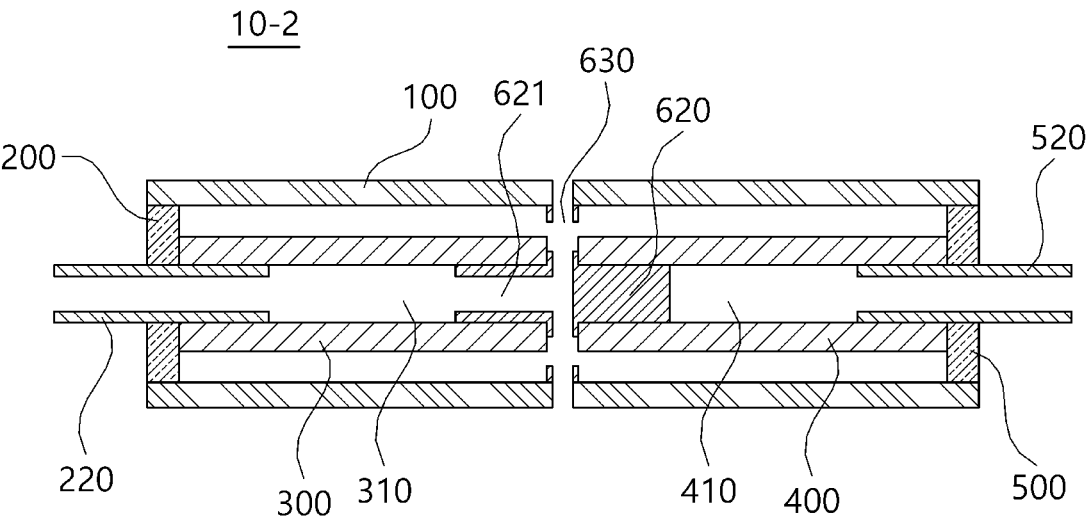
FIGS. 3 and 4 are views for explaining a double filter apparatus according to still another exemplary embodiment of the present disclosure.
Figure 4:
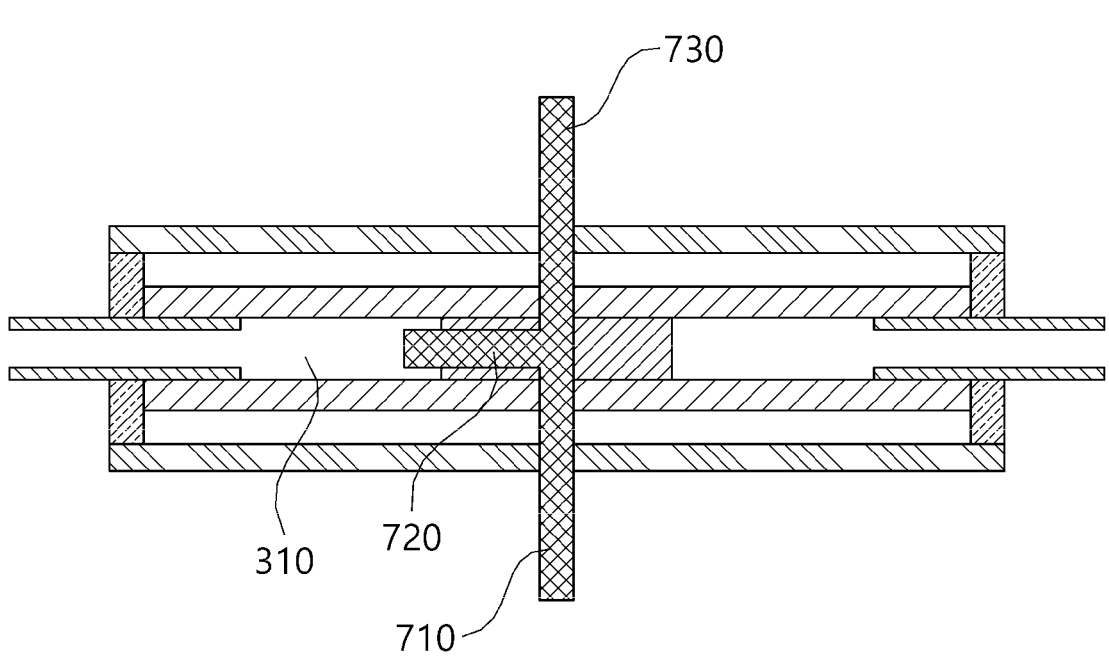

All the configurations illustrated in FIG. 2 are not essential configurations, and some configurations connected to the double filter structure 10-1 may be added, changed, and deleted, FIGS. 3 and 4 are views for explaining a double filter apparatus according to still another exemplary embodiment of the present disclosure.

FIGS. 3 and 4 are views illustrating a cross-section which is horizontal to a longitudinal direction and is perpendicular to a width direction of the double filter apparatus 10-2 according to another exemplary embodiment of the present disclosure.

Specifically, FIG. 3 is a cross section of the double filter apparatus 10-2 excluding the gas supply tube 700 to describe the structure of the double filter apparatus 10-2 according to still another exemplary embodiment of the present disclosure in detail.

Referring to FIGS. 3 and 4, the first filter unit 300 may be provided with an empty space to penetrate in the longitudinal direction.

In this case, the first space 310 may be an empty space provided in the first filter unit 300.

The partition 600 includes a filter fixing protrusion 620 which is provided to be fitted into the empty space provided in the first filter unit 300 to fix the first filter unit 300 to the partition 600.

The second filter unit 400 may be provided with an empty space so as to penetrate the longitudinal direction.

In this case, the filter fixing protrusion 620 is provided to be fitted into the empty spaces provided in the first filter unit 300 and the second filter unit 400 to fix the first filter unit 300 and the second filter unit 400 to the partition 600. Referring to FIG. 3, the partition 600 may provide a second space 630 to penetrate in the width direction.

Referring to FIGS. 3 and 4, the first pipe line 710 is located to be connected to the second space 630 from the outside of the housing unit 100.

The third pipe line 730 may be located to be connected to the outside of the housing unit 100 from the second space 630.

Referring to FIG. 3, the filter fixing protrusion 620 includes a third space 621 which penetrates in the longitudinal direction, at least partially overlaps the second space 630, and is provided to be connected to the first space 310.

The second pipe line 720 may be located in the third space.

The filter fixing protrusion 620 may be coupled to penetrate the partition 600, or attached on a surface of the partition 600 which is directed to the first filter unit 300 to fix the first filter unit 300 to the partition 600, or attached on a surface of the partition 600 which is directed to the second filter unit 400 to fix the second filter unit 400 to the partition 600.

Aerobic water treatment has the advantage of less odor and noise, but there is a problem in that pH is lowered because carbon dioxide gas may be generated due to the supply of high-purity oxygen.

The second filter unit 400 may be provided with a fourth space 410 therein.

The fourth space 410 may be an empty space provided in the second filter unit 400.

In the fourth space 410, a pH control unit (not illustrated) may be located to solve the pH lowering problem accompanying the aerobic water treatment process.

According to another exemplary embodiment of the present disclosure, various devices for water purification, such as an ultraviolet (UV) generator (not illustrated), a sterilization device (not illustrated), and a fluorine treatment device (not illustrated) may be provided in the fourth space 410.

Referring to FIG. 3, the inlet unit 200 includes a first path providing protrusion 220 which is provided with an empty space therein to penetrate in the length direction to provide a path through which the fluid is introduced into the inner space of the first filter unit 300 and at least partially fitted into the empty space provided in the first filter unit 300.

The first path providing protrusion 220 may be provided so as to at least partially protrude toward the outside of the housing unit 100. As the first path providing protrusion 220 is provided so as to at least partially protrude outwardly from the housing unit 100, the double filter structure 10-1 is used to be coupled to a pipe or a hose through which the fluid to be purified is supplied. As the first path providing protrusion 220 is provided so as to at least partially protrude outwardly from the housing unit 100, the user may separate the inlet unit 200 by applying a force to the first path providing protrusion 220 to replace the first filter unit 300 located in the housing unit 100.

The outlet unit 500 includes a second path providing protrusion 520 which is provided with an empty space therein to penetrate in the length direction to provide a path through which the fluid is discharged from the inner space of the second filter unit 400 to the outside of the housing unit and at least partially fitted into the empty space provided in the second filter unit 400.

The second path providing protrusion 520 may be provided so as to at least partially protrude toward the outside of the housing unit 100. As the second path providing protrusion 520 is provided so as to at least partially protrude outwardly from the housing unit 100, the double filter structure 10-1 is used to be coupled to a pipe or a hose which provides a path to discharge the fluid purified by the double filter structure 10-1. As the second path providing protrusion 520 is provided so as to at least partially protrude outwardly from the housing unit 100, the user may separate the outlet unit 500 by applying a force to the second path providing protrusion 520 to replace the second filter unit 400 located in the housing unit 100.

As the first filter unit 300 and the second filter unit 400 are replaced, the double filter structure 10-1 two different types of filters having different replacement cycles of the filters to increase the purification performance. For example, the HEPA filter is applied for the first filter unit 300 and the ceramic filter is applied to the second filter unit 400. Referring to FIGS. 3 to 4, the first filter unit 300 and the second filter unit 400 are formed to be thick in the width direction to cover at least a part of the through hole 610. By doing this, the flow is prevented from flowing to the center portion of the partition 600 to prevent the partition 600 from being deviated from a fixed position in the housing unit 100.

All the configurations illustrated in FIGS. 3 and 4 are not essential configurations, and some configurations connected to the double filter structure 10-2 may be added, changed, and deleted.

Figure 5:
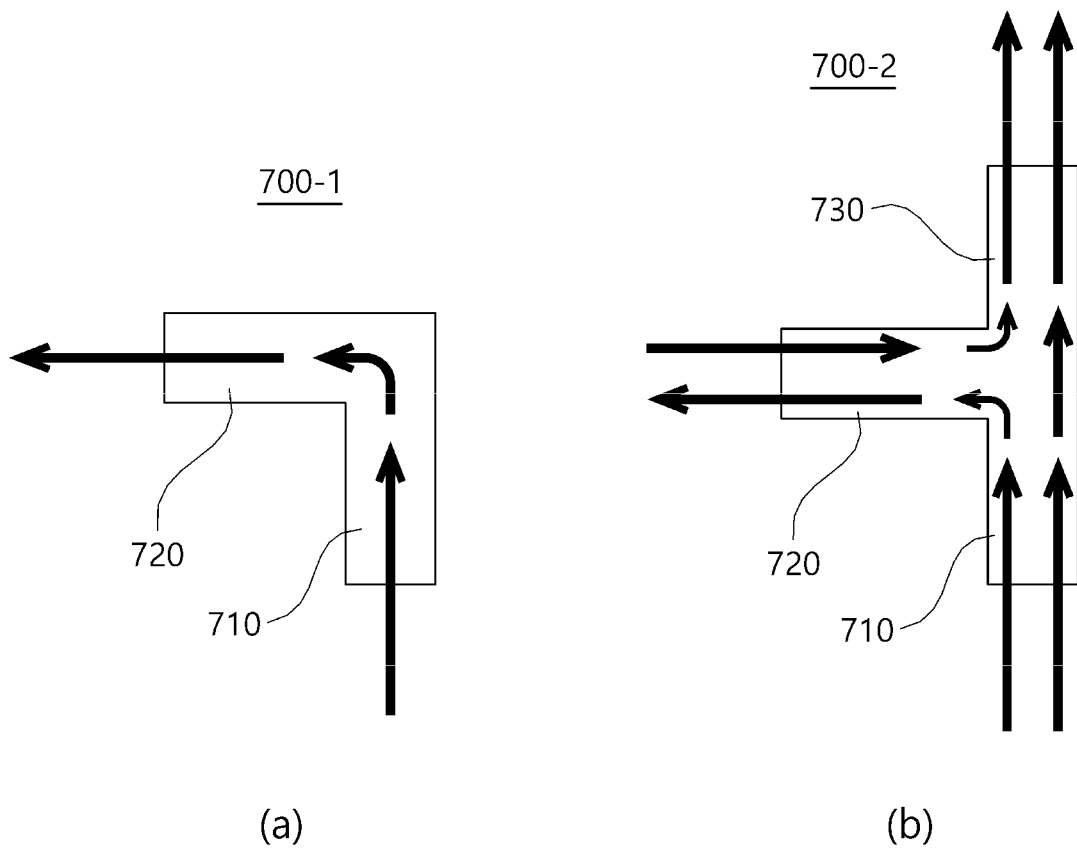
FIG. 5 is a view for explaining a gas supply tube according to various exemplary embodiments of the present disclosure.

FIG. 5 is a view for explaining a gas supply tube according to various exemplary embodiments of the present disclosure.

FIG. 5A is a view for explaining a gas supply tube 700-1 according to an exemplary embodiment of the present disclosure.

Referring to FIG. 5A, the gas supply tube 700 includes a first pipe line 710 and a second pipe line 720.

In this case, gas (for example, oxygen gas) supplied from the outside may move to the first space 310 in the first filter unit 300 through the first pipe line 710 and the second pipe line 720 along a direction illustrated in FIG. 5A.

FIG. 5B is a view for explaining a gas supply tube 700-2 according to another exemplary embodiment of the present disclosure.

Referring to FIG. 5B, the gas supply tube 700 includes a first pipe line 710, a second pipe line 720, and a third pipe line 730.

In this case, gas (for example, oxygen gas) supplied from the outside may move to the first space 310 in the first filter unit 300 through the first pipe line 710 and the second pipe line 720 along a direction illustrated in FIG. 5A.

At least a part of gas which moves through the movement path of the gas supplied by the first pipe line 710 may be discharged to the outside through the movement path provided by the third pipe line 730.

Air discharged from the first space 310 to the outside moves to the third pipe line 730 through the movement path of the gas supplied by the second pipe line 720 and then is discharged to the outside through the movement path provided by the third pipe line 730.

The first pipe line 710 and the third pipe line 730 may include at least one or more of valves (not illustrated) to control a flow rate of gas to be introduced or prevent the reverse flow of gas to be introduced or the reverse flow of the liquid to be purified by the double filter structure 10 or the double filter structure system 1.

Figure 6:
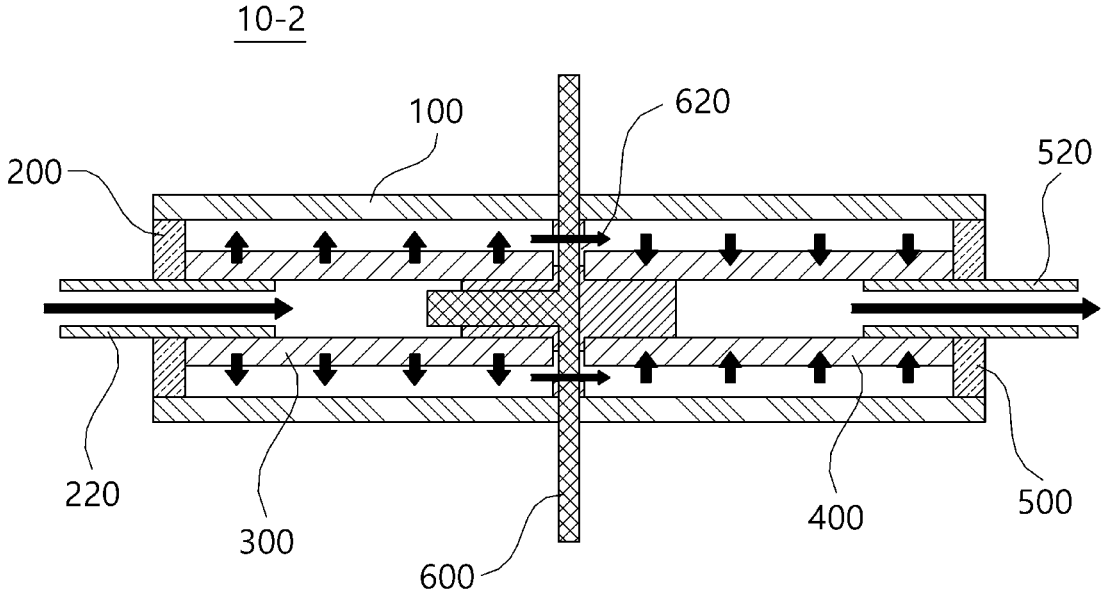
FIG. 6 is a view for explaining a flow of fluid in a double filter apparatus of FIGS. 3 and 4.

FIG. 6 is a view for explaining a flow of fluid in a double filter apparatus of FIGS. 3 and 4.

Referring to FIG. 6, the fluid to be purified may be introduced into the double filter structure 10-2 through the inflow path 210 provided by the inlet unit 200.

The fluid introduced through the inflow path 210 is sucked in the longitudinal direction of the first filter unit 300 to move to an empty space formed in the first filter unit 300 and then be discharged in the width direction to perform the primary purification.

Here, the fluid passes through the first space 310 in the first filter unit 300 to perform the aerobic water treatment by aerobic microorganisms.

The fluid discharged in the width direction of the first filter unit 300 may move to the space in which the second filter unit 400 is provided along the through holes 610-1 and 610-2 which are provided by the partition 600. Next, the fluid is sucked in the width direction of the second filter unit 400. After the fluid sucked in the width direction of the second filter unit 400 moves to the empty space formed in the second filter unit 400, the fluid is discharged in the longitudinal direction of the second filter unit 400 to perform the secondary purification.

The fluid discharged from the second filter unit 400 may be leaked to the outside of the double filter structure 10-2 through an outflow path 510 provided by the outlet unit 500.

The movement path of the fluid is not limited as illustrated in FIG. 6 and as described with reference to FIG. 6 so that even though the fluid to be purified is introduced in an opposite direction to the movement direction of the fluid illustrated in FIG. 6, that is, through the outflow path 510, and is leaked through the inflow path 210, the double filter structure 10 may function as expected by the present disclosure. That is, the double filter structure 10-2 according to the present disclosure may be a filter structure which may be bi-directionally used.

Figure 7:
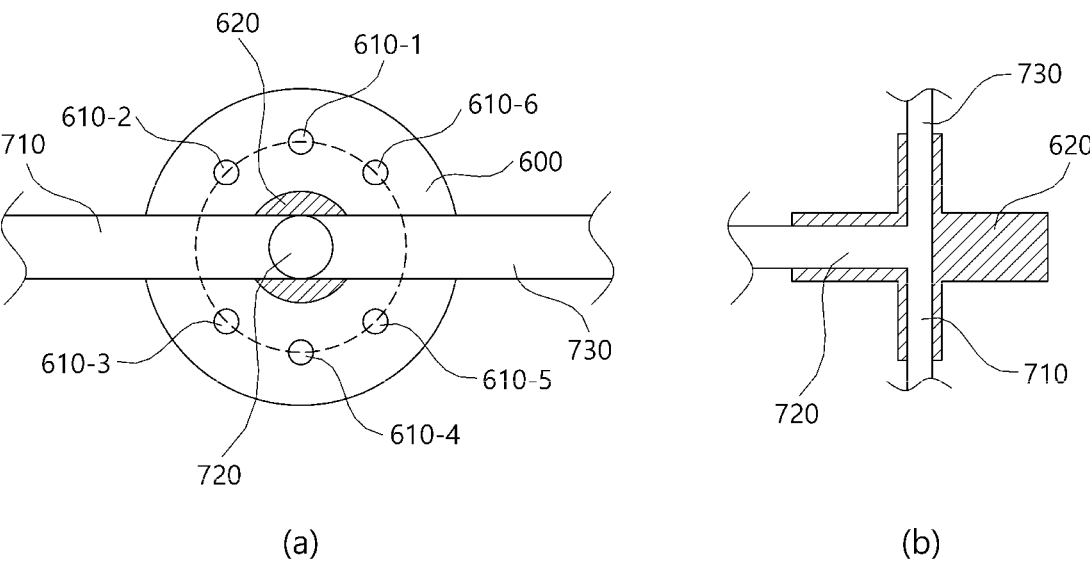
FIG. 7 is a diagram for explaining a partition according to various exemplary embodiments of the present disclosure.

FIG. 7 is a diagram for explaining a partition according to various exemplary embodiments of the present disclosure.

At least one through hole 610 may be provided to be spaced apart from each other along a circle having a diameter which is larger than the filter fixing protrusion 620 and is smaller than an internal circumferential surface of the housing unit 100.

The partition 600 may be in contact with the internal circumferential surface of the housing unit 100 without forming an empty space, but may provide the through hole 610 to provide a movement path of the fluid together with the inner circumferential surface of the housing unit 100.

When the partition 600 is fixed to the inner circumferential surface of the housing unit 100, the plurality of through holes 610 may be provided to be located between the partition 600 and the inner circumferential surface of the housing unit 100. In this case, a pressure applied to the partition 600 from the fluid which passes through the through holes 610 is dispersed toward the inner circumferential surface of the housing unit 100 as compared with the through hole 610 is located only in the width and the partition 600, the first filter unit 300, and the second filter unit 400 are prevented from being deviated from the fixed location due to the pressure of the fluid.

Widths of the plurality of through holes 610 may be provided to be smaller than the widths of the inflow path 210 and the outflow path 510.

The plurality of through holes 610 may be provided to be larger than a width of a first pipe line 710, a second pipe line 720, and a third pipe line 730, but is not necessarily limited thereto.

Referring to FIG. 7A, the first pipe line 710 and the third pipe line 730 may be provided by avoiding a location where the plurality of through holes 610 is located so as not to interrupt the movement of the fluid which passes the through hole 610, but is not necessarily limited thereto. When a width of the through hole 61o is sufficiently large, the first pipe line 710 and the third pipe line 730 may be provided to traverse the through hole 610.

Referring to FIG. 7B, outer circumferential surfaces of the first pipe line 710 and the third pipe line 730 may be located to be in contact with the inner circumferential surface of the second space without having an empty space.

An outer circumferential surface of the second pipe line 720 may be in contact with the inner circumferential surface of the third space 621 without having an empty space.

According to the exemplary embodiment of the present disclosure, the through hole 610 may include a screw thread (not illustrated) formed by spirally winding along an inner circumferential surface of the through hole 610.

The through hole 610 may be a hole formed in the form of a cylinder, and the screw thread may be formed by spirally winding along a surface corresponding to the outer circumferential surface of the cylinder.

As the through hole 610 includes the screw thread, the fluid which is discharged from the first filter unit 300 to pass through the through hole 610 and moves to an area where the second filter unit 400 is located collides with the screw thread provided on the through hole 610. Therefore, a predetermined vortex is generated with the central axis in the longitudinal direction, and vortex motion can be performed in the space between the second filter unit 400 and the housing unit 100. By doing this, the fluid receives a stronger force in the width direction toward the inside of the second filter unit 400 to be more easily introduced in the width direction of the second filter unit 400.

Figure 8:
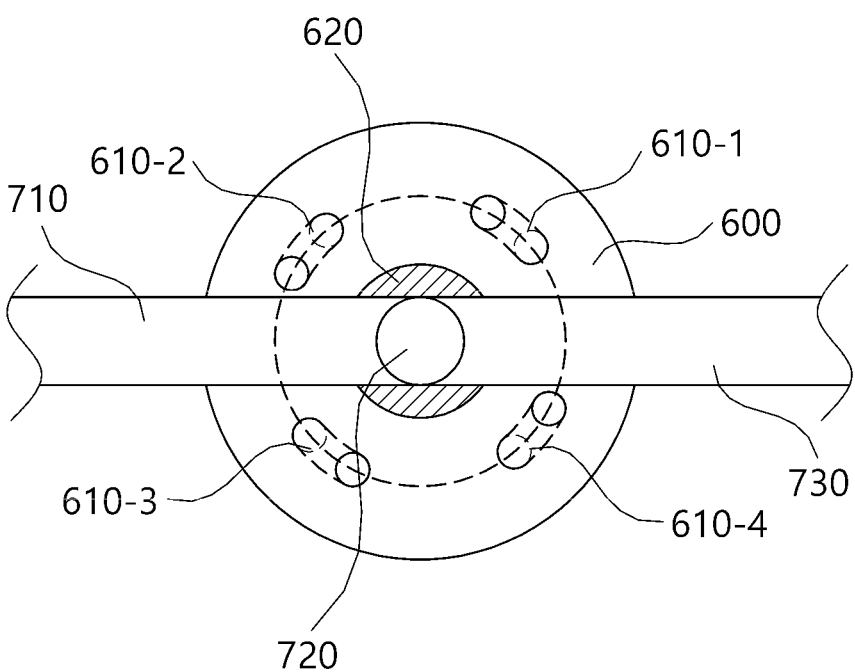
FIG. 8 is a view for explaining a partition and throughhole according to an exemplary embodiment of the present disclosure.

FIG. 8 is a view for explaining a partition and through-hole according to an exemplary embodiment of the present disclosure.

Referring to FIG. 8, the plurality of through holes 610-1, 610-2, 610-3, ad 610-4 included in the partition 600 may be provided to form a spiral structure along the longitudinal direction of the partition 600. The plurality of through holes 610-1, 610-2, 610-3, and 610-4 may penetrate to form a spiral structure with the longitudinal direction of the partition 600 as an axis.

As the plurality of through holes 610-1, 610-2, 610-3, and 610-4 is provided to form a spiral structure along the longitudinal direction of the partition 600, the fluid which passes through the plurality of through holes 610-1, 610-2, 610-3, and 610-4 may rotate and move with respect to the longitudinal center axis of the housing unit 100. To be more specific, the fluid which passes through the plurality of through holes 610-1, 610-2, 610-3, and 610-4 may rotate and move with respect to the longitudinal center axis of the housing unit 100 along the outer circumferential surface of the second filter unit 400.

By doing this, the fluid receives stronger force in the width direction toward the inside of the second filter unit 400 to be more easily introduced in the width direction of the second filter unit 400.

Figure 9:
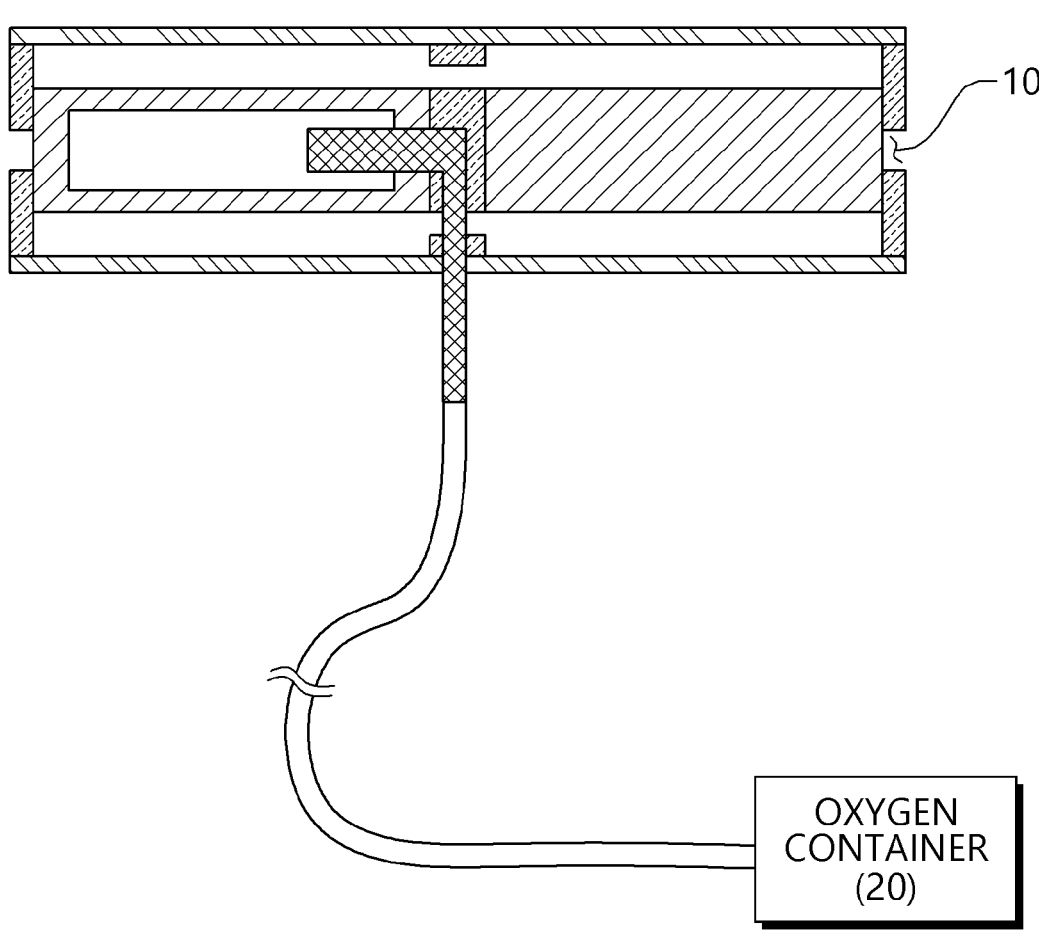
FIG. 9 is a perspective view illustrating a double filter system according to an embodiment of the present disclosure.

FIG. 9 is a perspective view illustrating a double filter system according to an embodiment of the present disclosure.

Referring to FIG. 9, the double filter system 1 includes a double filter apparatus 10 and an oxygen container 20.

The double filter apparatus 10 may be as described with reference to FIG. 1. Further, the double filter apparatus 10-1 according to another exemplary embodiment of the present disclosure described with respect to FIG. 2 and the double filter apparatus 10-2 according to still another exemplary embodiment of the present disclosure described with respect to FIGS. 3 and 4 may also be applied in the double filter system 1 instead of the double filter apparatus 10.

The oxygen container 20 accommodates oxygen and is connected to the gas supply tube 700 through a pipe to supply oxygen to the double filter apparatus 10. The oxygen container 20 includes an oxygen generator (not illustrated). The oxygen container 20 may accommodate oxygen required for survival of the aerobic microorganisms in the first space 310.

The oxygen generator (not illustrated) is an oxygen generating device, and may include an oxygen generator that sucks external air to generate high-purity oxygen and discharges internal heat, and a booster that boosts and supplies the high-purity oxygen generated in the oxygen generator. The oxygen generator may be a device which removes pollutants and nitrogen in the air, highly concentrates oxygen, and sends the oxygen to a place where it is needed.

Various exemplary embodiments of the double filter apparatus and a system according to the present disclosure are not limited to the aerobic water treatment, but perform sterilization water treatment using microbubbles or nanobubbles.

To be more specific, the gas supply tube 700 provides a path to move oxygen gas supplied from a nano bubble generating device (not illustrated) or a micro bubble generating device (not illustrated) to the first space 310 and the negatively charged micro bubbles or nano bubbles that have moved to the first space 310 lead positively charged bacteria with electrostatic force, and hydroxyl radicals are instantaneously generated by physical impact or self-destruction, and the energy generated is good for bacteria, viruses, etc. can destroy microorganisms and bring about a sterilization effect.

The double filter apparatus and system according to still another exemplary embodiment of the present disclosure further includes an oxygen saturation calculating unit (not illustrated) connected to the oxygen container 20.

The oxygen saturation calculating unit calculates an oxygen saturation of the first space 310 to transmit the calculated result value to the oxygen container 20. The oxygen saturation calculating unit may be wiredly connected through the gas supply tube 700, but also transmit the calculated result value through the wireless communication.

The oxygen container 20 determines an amount of oxygens to be supplied based on the calculated oxygen saturation.

For example, the calculated oxygen saturation corresponds to a predetermined first reference range (for example, 30 to 40%), the oxygen container 20 may supply the oxygen by a predetermined first number of times (for example, three times) per hour.

The calculated oxygen saturation corresponds to a predetermined second reference range (for example, 40 to 50%), the oxygen container 20 may supply the oxygen by a predetermined second number of times (for example, two times) per hour.

The calculated oxygen saturation corresponds to a predetermined third reference range (for example, 40 to 50%), the oxygen container 20 may supply the oxygen by a predetermined third number of times (for example, one time) per hour.

Even though it has been described above that all components of the exemplary embodiment of the present invention are combined as one component or operate to be combined, the present invention is not limited to the exemplary embodiment. In other words, one or more components may be selectively combined to be operated within a scope of the present invention.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the scope of the present invention.

What is claimed is:

1. A double filter apparatus, comprising:
a housing unit which is provided to penetrate in a longitudinal direction to include an inner space;
an inlet unit which is located at one side of the housing unit and provides an inflow path of the fluid;
a first filter unit which includes a first space and sucks fluid introduced from the inflow path in the longitudinal direction and discharges the sucked fluid to the width direction;

a second filter unit which sucks the discharged fluid in the width direction and discharges the fluid in the longitudinal direction;

a partition which connects the first filter unit and the second filter unit;

an outlet unit which is located at the other side of the housing unit and provides an outflow path of the fluid discharged from the second filer unit; and a gas supply tube which is provided to supply gas supplied from the outside to the first space and includes:

a first pipe line which is provided to penetrate an outer wall of the housing unit from the outside of the housing unit;

a second pipe line which is connected to the first pipe line and provides a movement path to supply the gas supplied through the first pipe line to the first space; and a third pipe line which is connected to the first pipe line and the second pipe line and provides a path to discharge the gas from the first space to the outside of the housing unit;

wherein the partition is fixed to an inner circumferential surface of the housing unit to divide the inner space of the housing unit into a space in which the first filter unit is located and a space in which the second filter unit is located and at least one through hole is provided to provide a movement path through which the fluid discharged from the first filter unit is introduced into the second filter unit.

2. The double filter apparatus according to claim 1, wherein the first filter unit provides an empty space to penetrate in the longitudinal direction and the first space is an empty space provided in the first filter unit.

3. The double filter apparatus according to claim 2, wherein the partition includes a filter fixing protrusion which is provided to be fitted into the empty space provided in the first filter unit to fix the first filter unit to the partition.

4. The double filter apparatus according to claim 3, wherein the partition provides a second space to penetrate in the width direction, the first pipe line is located to be continued with the second space from the outside of the housing unit, and the third pipe line is located to be continued with the outside of the housing unit from the second space.

5. The double filter apparatus according to claim 4, wherein the filter fixing protrusion includes: a third space which penetrates in the longitudinal direction, at least partially overlaps the second space, and is connected to the first space, and the second pipe line is located in the third space.

6. The double filter apparatus according to claim 2, wherein the inlet unit includes a first path providing protrusion which is provided with an empty space therein to penetrate in the length direction to provide a path through which the fluid is introduced into the inner space of the first filter unit and at least partially fitted into the empty space provided in the first filter unit.

7. The double filter apparatus according to claim 6, wherein the first path providing protrusion is provided to at least partially protrude outwardly from the housing unit.

8. The double filter apparatus according to claim 1, wherein the through hole includes a screw thread formed by spirally winding along the inner circumferential surface.

9. The double filter apparatus according to claim 1, wherein the through hole penetrates to form a spiral structure with a longitudinal direction of the partition as an axis.

10. A double filter system, comprising:

a double filter apparatus including: a housing unit which is provided to penetrate in a longitudinal direction to include an inner space; an inlet unit which is located at one side of the housing unit and provides an inflow path of the fluid; a first filter unit which includes a first space and sucks fluid introduced from the inflow path in the longitudinal direction and discharges the sucked fluid to the width direction; a second filter unit which sucks the discharge fluid in the width direction and discharges the fluid in the longitudinal direction; an outlet unit which is located at the other side of the housing unit and provides an outflow path of the fluid discharged from the second filer unit; and a gas supply tube which is provided to supply gas supplied from the outside to the first space; and an oxygen container which accommodates oxygen and is connected to the gas supply tube through the pipe to supply oxygen to the double filter apparatus;

wherein the gas supply tube includes:

a first pipe line which is provided to penetrate an outer wall of the housing unit from the outside of the housing unit;

a second pipe line which is connected to the first pipe line and provides a movement path to supply the gas supplied through the first pipe line to the first space; and a third pipe line which is connected to the first pipe line and the second pipe line and provides a path to discharge the gas from the first space to the outside of the housing unit;

wherein the partition is fixed to an inner circumferential surface of the housing unit to divide the inner space of the housing unit into a space in which the first filter unit is located and a space in which the second filter unit is located and at least one through hole is provided to provide a movement path through which the fluid discharged from the first filter unit is introduced into the second filter unit.

* * * * *